United States Patent [19]

Hirai et al.

[11] Patent Number: 4,757,111

[45] Date of Patent: Jul. 12, 1988

[54] WEATHER-RESISTANT RESIN, AND ITS PRODUCTION

[75] Inventors: Mikio Hirai; Yoshiaki Nishikubo; Tomio Yoshida, all of Niihama; Tsuneo Ochi, Ehime, all of Japan

[73] Assignee: Sumitomo Naugatuck Co., Ltd., Osaka, Japan

[21] Appl. No.: 813,331

[22] Filed: Dec. 26, 1985

[51] Int. Cl.$^4$ .................... C08F 255/06; C08F 255/04
[52] U.S. Cl. .................................. 525/316; 525/289; 525/290; 525/310; 525/309; 315/322; 315/324
[58] Field of Search ............... 525/309, 324, 289, 290, 525/310, 316

[56] References Cited

U.S. PATENT DOCUMENTS 4,490,507 12/1984 Abe et al. ............................ 525/309
4,490,508 12/1984 Nagano et al. ....................... 525/324

FOREIGN PATENT DOCUMENTS 0058979 9/1982 European Pat. Off. ............ 525/289
0137041 10/1979 Japan ................................. 525/309

Primary Examiner—Wilbert J. Briggs, Sr.

[57] ABSTRACT

A weather-resistant resin having excellent impact resistance, processability and appearance, which comprises a graft polymer comprising an ethylene/alpha-olefin elastomer and at least one monomeric component chosen from aromatic vinyl monomers, vinyl cyanides and alkyl unsaturated carboxylates grafted thereon, the graft polymer having a material soluble in tetrahydrofuran and n-hexane in a volume ratio of 1:4 in a content of not more than 40% by weight and having a material insoluble in tetrahydrofuran in a content of not more than 60% by weight.

4 Claims, No Drawings

WEATHER-RESISTANT RESIN, AND ITS PRODUCTION

The present invention relates to a weather-resistant resin, and its production. More particularly, it relates to a weather-resistant resin excellent in impact resistance, processability and appearance, and its production.

As seen in high impact-resistant polystyrene (HIPS), ABS resins and the like, it is well known to introduce elastomeric materials into resins so as to improve the mechanical characteristics such as impact resistance of the resins. It is also known that non-conjugated diene rubbers are generally more excellent in weather resistance than conjugated diene rubbers such as polybutadiene, and in fact, there are recently provided weather-resistant resins comprising non-conjugated diene rubbers as the elastomeric materials. Examples of such weather-resistant resins are AES resins, ACS resins, AAS resins, etc.

In general, these weather-resistant resins comprising non-conjugated diene rubbers are enhanced in impact resistance with the increase of the content of the elastomeric materials. But, such increase in the elastomeric material content results in significant deterioration in processability and appearance.

As a result of the extensive study, it has now been found that a weather-resistant resin comprising a certain specific graft polymer based on an ethylene/alpha-olefin elastomer shows excellent properties not only in impact resistance but also in processability and appearance. The present invention is based on the above finding.

According to the present invention, there is provided a weather-resistant resin excellent in impact resistance, processability and appearance, which comprises a graft polymer comprising an ethylene/alpha-olefin elastomer and at least one monomeric component chosen from aromatic vinyl monomers, vinyl cyanides and alkyl unsaturated carboxylates grafted thereon, the graft polymer containing material soluble in a mixture of tetrahydrofuran and n-hexane in a volume ratio of 1:4 in not more than about 40% by weight based on the weight of the graft polymer and a material insoluble in tetrahydrofuran in not more than about 60% by weight based on the weight of the graft polymer.

The ethylene/alpha-olefin elastomer may be any polymeric elastomer comprising units of ethylene and at least one alpha-olefin as the essential monomeric units. Its specific examples are a binary copolymer of ethylene and propylene or butene, a ternary copolymer of ethylene, propylene or butene and a non-conjugated diene (e.g. dicyclopentadiene, ethylidene-norbornene, 1,4-hexadiene, 1,4-cycloheptadiene, 1,5-cyclooctadiene), etc. In these binary or ternary copolymers, the molar ratio of ethylene and the alpha-olefin (e.g. propylene, butene) is preferred to be from about 5:1 to about 1:3. In the case of the ternary copolymers, the unit of the non-conjugated diene may be included in such an amount as giving an iodine value of about 2 to 50.

As the aromatic vinyl monomers, there are exemplified styrene, alpha-methylstyrene, vinyltoluene, methyl-alpha-methylstyrene, t-butylstyrene, chlorostyrene, etc. Examples of the vinyl cyanides are acrylonitrile, methacrylonitrile, etc. Examples of the alkyl unsaturated carboxylates are lower alkyl acrylate (e.g. methyl acrylate, ethyl acrylate, propyl acrylate, butyl acrylate), lower alkyl methacrylate (e.g. methyl methacrylate, ethyl methacrylate, propyl methacrylate, butyl methacrylate), hydroxy(lower)alkyl acrylate (e.g. hydroxymethyl acrylate, hydroxyethyl acrylate, hydroxypropyl acrylate), hydroxy(lower)alkyl metahacrylate (e.g. hydroxymethyl methacrylate, hydroxyethyl methacrylate, hydroxypropyl methacrylate), glycidyl acrylate, glycidyl methacrylate, etc. Among these monomers, one or more chosen from styrene, acrylonitrile and methyl methacrylate are particularly preferred.

In the graft polymer, the weight proportion of the ethylene/alpha-olefin elastomer and the monomeric components grated thereon is not limitative, but it is preferred to be from about 5:95 to about 95:5, particularly from about 10:90 to about 60:40.

In the graft polymer, the material soluble in a mixture of tetrahydrofuran and n-hexane (1:4 by volume) is to be contained in an amount of not more than about 40% by weight, and the material insoluble in tetrahydrofuran is to be contained in an amount of not more than 60% by weight. When the content of the tetrahydrofuran/n-hexane soluble material is more than about 40% by weight, the processability is enhanced but the impact resistance is decreased. In consideration of the balance between the impact resistance and the processability, the tetrahydrofuran/n-hexane soluble material is preferred to be from about 10 to 40% by weight, particularly from about 20 to 40% by weight. When the content of the tetrahydrofuran insoluble material is more than about 60% by weight, the appearance such as gloss and flow mark is harmed. In order to keep a better appearance, it is particularly preferred to be not more than about 50% by weight.

The contents of the tetrahydrofuran/n-hexane soluble material and of the tetrahydrofuran insoluble material may be deterimined in the following manner:

The weather-resistant resin (1 part by weight) is immersed in methylethylketone (100 parts by weight) at room temperature (about 15° C.) for 24 hours and centrifuged at 12,000 rpm for 20 minutes, followed by decantation to collect an insoluble graft polymer. The graft polymer is subjected to heat pressing at 200° C. for 5 minutes to make a sheet of 1 mm thick. One gram of the sheet is immersed in a mixture of tetrahydrofuran and n-hexane (1:4 by volume) (200 ml) at room temperature (about 15° C.) for 48 hours and filtered through a 300 mesh screen to collect an insoluble material. The weight of the insoluble material is measured, and the content of the soluble material (in tetrahydrofuran/n-hexane) is determined therefrom. Likewise, one gram of said sheet is immersed in tetrahydrofuran (200 ml) at room temperature (about 15° C.) for 48 hours and filtered through a 300 mesh screen to collect an insoluble material, of which the weight is measured, and its content is determined.

For preparation of the graft polymer having a tetrahydrofuran/n-hexane soluble material content of not more than about 40% by weight and a tetrahydrofuran insoluble material content of not more than about 60% by weight, any conventional polymerization procedure such as suspension polymerization or solution polymerization may be adopted with appropriate selection of the kind and amount of the ethylene/alpha-olefin elastomer, the kinds and amounts of the polymerization initiator and/or the molecular weight regulator, the polymerization temperature, etc. As to the ethylene/alpha-olefin elastomer, the choice of a suitable iodine value and an appropriate Mooney viscosity is desirable. Some typical examples of the procedure for preparation of the graft polymer as usable in this invention are shown below:

Solution polymerization

An ethylene/alpha-olefin elastomer (100 parts by weight) is dissolved in a solvent (30 to 20,000 parts by weight) such as an aromatic solvent (e.g. toluene, ethylbenzene), an aliphatic solvent (e.g. hexane, heptane) or a polar solvent (e.g. acetone, ethyl acetate, ethylene dichloride), and one or more monomers (50 to 900 parts by weight) chosen from aromatic vinyl monomers, vinyl cyanides and alkyl unsaturated carboxylates are added thereto. One or more of organic peroxides (0.05 to 5 parts by weight) soluble in said monomer(s) such as benzoyl peroxide, lauroyl peroxide, dicumyl peroxide, t-butyl peroxypivalate and t-butyl peroxy-2-ethylhexanoate are added thereto. Graft polymerization is effected at a temperature of 50° to 150° C. Prior to or during the polymerization, a molecular weight regulating agent (e.g. t-dodecylmercaptan) may be optionally introduced into the reaction system in an amount of not more than 3 parts by weight to 100 parts by weight of the combined amount of the ethylene/alpha-olefin elastomer and the monomer(s).

Solution-suspension or suspension polymerization

To a solution of an ethylene/alpha-olefin elastomer (100 parts by weight) in the solvent (30 to 20,000 parts by weight) as exemplified above or a suspension of an ethylene/alpha-olefin elastomer (100 parts by weight) as finely cut in the solvent (30 to 20,000 parts by weight) as exemplified above containing one or more dispersing agents chosen from cellulose compounds (e.g. methylcellulose, hydroxymethylcellulose), acrylic acid compounds (e.g. polyacrylic acid, sodium polyacrylic acid), inorganic salts (e.g. calcium phosphate, calcium carbonate, calcium pyrophosphate), polyalkylene oxides (e.g. polyethylene oxide, polypropylene oxide), etc., one or more monomers (50 to 900 parts by weight) chosen from aromatic vinyl monomers, vinyl cyanides and alkyl unsaturated carboxylates are added. Then, the organic peroxide (0.05 to 5 parts by weight) as exemplified above is added thereto. Graft polymerization is effected at a temperature of 50° to 150° C. Prior to or during the polymerization, a molecular weight regulating agent (e.g. t-dodecylmercaptan) may be optionally introduced into the reaction system in an amount of not more than 3 parts by weight to 100 parts by weight of the combined amount of the ethylene/alpha-olefin elastomer and the monomer(s).

The reaction mixture of the polymerization comprises the graft polymer having the soluble and insoluble material contents as defined above usually in a content of to 10 to 100% by weight. The reaction mixture may be used as such as the source of the graft polymer. In other words, the reaction mixture itself may be used as the weather-resistant resin of the invention or as part of it. Alternatively, the graft polymer may be separated from the reaction mixture to any desired extent. In other words, the graft polymer thus separated may be used as the weather-resistant resin of the invention or as part of it.

The weather-resistant resin of the invention may be incorporated with any conventional additives such as dyestuffs, pigments, antioxidants, plasticizers, antistatic agents, ultraviolet ray absorbers, lubricants and fillers. It may be also blended with any other thermoplastic resins such as acrylonitrile/styrene copolymers, styrene/maleic anhydride copolymers, styrene/methyl methacrylate copolymers, polymethyl methacrylate and polycarbonate. In any event, the content of the graft polymer having the soluble and insoluble material contents as above defined in the resultant composition is preferred to constitute not less than 5% by weight, particularly not less than 10% by weight.

Practical and presently preferred embodiments of the invention are illustratively shown in the following Examples wherein part(s) and % are by weight.

EXAMPLE 1

According to a per se conventional suspension polymerization procedure, ethylene/alpha-olefin copolymer (50 parts), styrene (35 parts) and acrylonitrile (15 parts) were subjected to graft polymerization. With variation of the iodine value and Mooney viscosity of the ethylene/alpha-olefin copolymer, the kind and amount of the polymerization initiator, the amount of the molecular weight regulator and the temperature of the polymerization, there were obtained graft polymers having different tetrahydrofuran/n-hexane soluble material contents and tetrahydrofuran insoluble material contents.

EXAMPLE 2

According to a per se conventional solution polymerization procedure, ethylene/alpha-olefin copolymer (20 parts), styrene (55 parts) and acrylonitrile (25 parts) were subjected to graft polymerization. With variation of the kind of the polymerization initiator, there were obtained graft polymers having different tetrahydrofuran/n-hexane soluble material contents and tetrahydrofuran insoluble material contents.

EXAMPLE 3

The graft polymer as prepared in Example 1 or 2 was blended with styrene/acrylonitrile copolymer (70/30 by weight) to give a resin composition comprising the rubber in a content of 22%. The resin composition was injection molded by the use of an injection molding machine (manufactured by Nissei Resin Mfg. Co., Ltd.; Model FS-75 (3.5 ounces) at a molding temperature of 240° C. and a mold temperature of 60° C., and the molded product was subjected to evaluation of the impact strength, the processability and the appearance.

The polymerization conditions, the polymerization results and the physical properties of the molded products are shown in Table 1.

TABLE 1

| Run No. | EPDM Iodine value | EPDM Mooney viscosity | Polymerization initiator (part(s)) | Molecular weight regulating agent (part(s)) | Polymerization temperature (°C.) | Polymerization mode |
|---|---|---|---|---|---|---|
| 1 | 9 | 87 | PV (3) | TDM (0.3) | 100 | Suspension |
| 2 | 9 | 87 | PV (3) | — | 100 | Suspension |
| 3 | 15 | 75 | PV (4.5) | TDM (0.3) | 100 | Suspension |
| 4 | 9 | 115 | PV (3) | TDM (0.2) | 80 | Suspension |
| 5 | 21 | 75 | BPO/LPO (1/1) | — | 67 | Solution |

TABLE 1-continued

| Run No. | | | | | | | |
|---|---|---|---|---|---|---|---|
| 6 | 9 | 87 | O (2) | TDM (0.3) | | 100 | Suspension |
| 7 | 9 | 115 | PV (3) | — | | 100 | Suspension |
| 8 | 21 | 75 | BPO (2) | — | | 67 | Solution |
| 9 | 9 | 43 | O (2) | — | | 100 | Suspension |
| 10 | 9 | 87 | O (2) | — | | 100 | Suspension |
| 11 | 9 | 87 | PV (1) | — | | 100 | Suspension |
| 12 | 15 | 75 | PV (3) | — | | 65 | Suspension |

| Run No. | Graft polymer | | | Notched Izod impact strength (¼", 23° C.) (kg · cm/cm) | Processability (210° C., 30 kg/cm$^2$) (ml/min) | Gloss (60" specular gloss) (%) |
|---|---|---|---|---|---|---|
| | Grafting rate (%) | Soluble material (%) | Insoluble material (%) | | | |
| 1 | 33 | 23 | 24 | 58 | 0.14 | 94 |
| 2 | 52 | 24 | 37 | 55 | 0.17 | 93 |
| 3 | 38 | 18 | 20 | 45 | 0.15 | 95 |
| 4 | 41 | 34 | 27 | 51 | 0.16 | 94 |
| 5 | 43 | 22 | 40 | 49 | 0.13 | 93 |
| 6 | 36 | 24 | 45 | 58 | 0.11 | 92 |
| 7 | 55 | 8 | 35 | 60 | 0.032 | 94 |
| 8 | 75 | 8 | 65 | 57 | 0.038 | 83 |
| 9 | 53 | 30 | 63 | 54 | 0.16 | 84 |
| 10 | 55 | 9 | 65 | 69 | 0.052 | 83 |
| 11 | 41 | 41 | 18 | 17 | 0.19 | 95 |
| 12 | 59 | 46 | 38 | 14 | 0.21 | 93 |

Notes:
(1) Run Nos. 1 to 7, embodiments of the invention; Run Nos. 8 to 12, for comparison.
(2) The abbreviations have the following meanings: RPDN, ethylene-propylene-ethylidenenorbornene copolymer (propylene content, 50%); PV, t-butyl peroxypivalate; BPO, benzoyl peroxide; LPO, lauroyl peroxide; O, t-butyl peroxy-2-ethyl-hexanoate; TDM, t-dodecylmercaptan.
(3) Soluble material, in a mixture of tetrahydrofuran and n-hexane (1:4 by volume); insoluble material, in tetrahydrofuran.
(4) Impact strength, ABTM D256; processability, JIS K7210 (Koka type flow; orifice of 1 mm and 10 mm long); gloss, JIS Z8741

What is claimed is:

1. A method for selecting and obtaining a graft polymer having well-balanced excellent physical properties from graft polymers comprising an ethylene-propylene-nonconjugated diene elastomer grafted with a combination of a vinyl aromatic monomer and a vinyl cyanide, which comprises measuring the contents in the graft polymers of the material soluble in tetrahydrofuran and n-hexane in a volume ratio of 1:4 and of the material insoluble in tetrahydrofuran and selecting a graft polymer comprising a tetrahydrofuran/n-hexane mixture-soluble material content of not more than 40% by weight and a tetrahydrofuran-insoluble material content of not more than 60% by weight.

2. The method of claim 1 comprising selecting graft polymer comprising by weight from 10 to 40% tetrahydrofuron/n-hexane mixture-soluble material content and a tetrahydrofuran-insoluble material content of not more than 50% by weight.

3. The method of claim 2 comprising selecting graft polymer comprising by weight from 20 to 40% tetrahydrofuran/n-hexane mixture-soluble material content.

4. The method of claim 3 wherein the vinyl aromatic monomer is styrene and the vinyl cyanide is acrylonitrile.

* * * * *